Patented Dec. 25, 1951

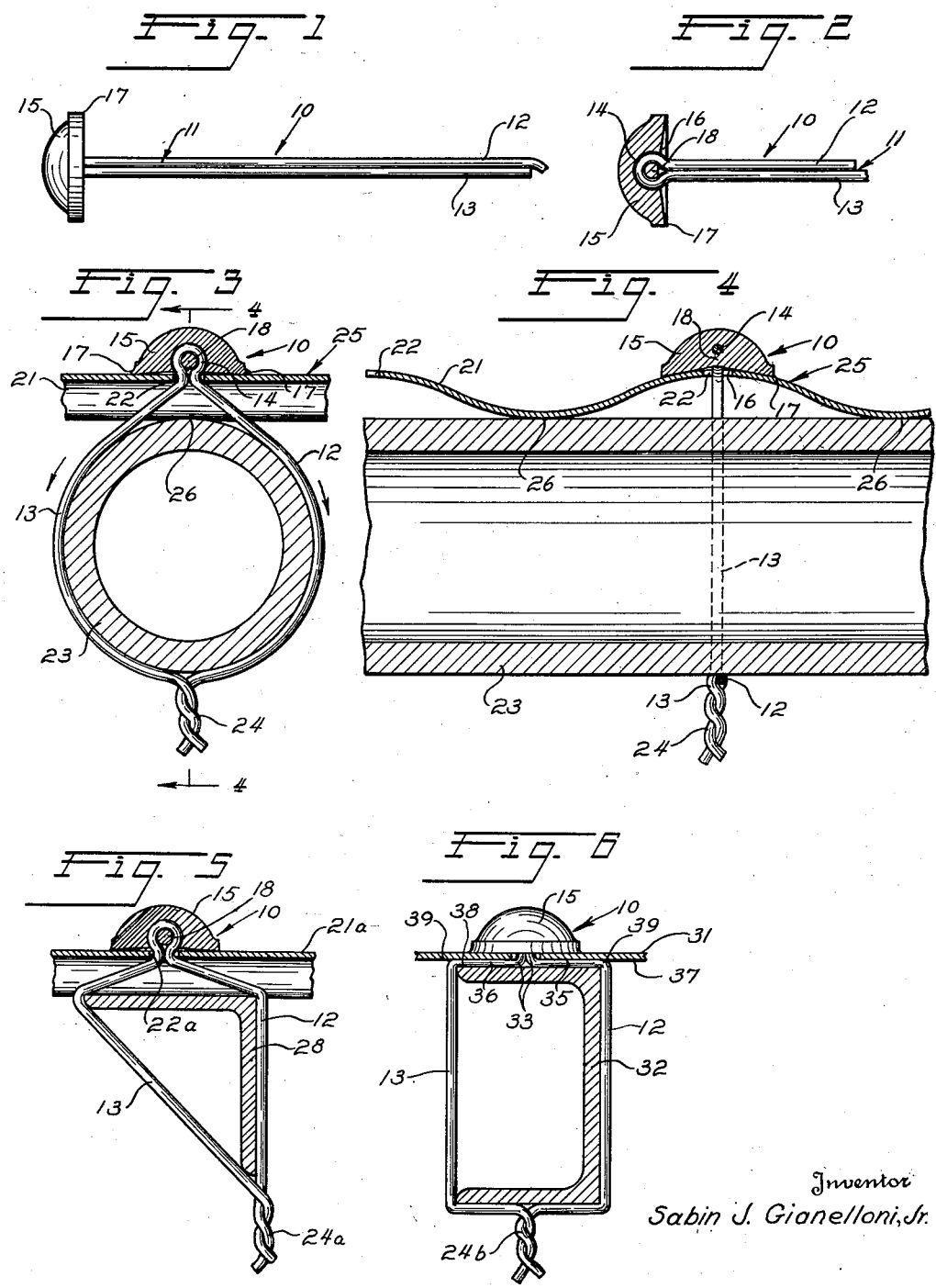

2,579,489

UNITED STATES PATENT OFFICE 2,579,489

WIRE FASTENER FOR SECURING SHEET METAL TO IMPERFORATE FRAME MEMBERS

Sabin J. Gianelloni, Jr., Baton Rouge, La.

Application November 16, 1945, Serial No. 629,004

3 Claims. (Cl. 24—27)

The present invention relates to sheet metal building constructions and more particularly to a novel manner and means for securing a sheet metal covering panel to imperforate metallic frame members.

While sheet metal buildings embodying an imperforate metal framework are well known in the art, a considerable item of cost in the construction of such buildings has been occasioned by the unsuitable and unsatisfactory fastening elements employed to secure the sheet metal siding and roofing to the imperforate framework. An example of such prior art fasteners is the well known Dickson lead head roof fastener of Patent 1,984,130, dated December 11, 1934. These fasteners require considerable time to assemble properly and often do not fasten the covering panels to the framework securely in spite of the care used in assembling them. Furthermore, such fasteners are not suitable for use where the framework is composed of cylindrical members or other shapes lacking an exposed edge.

A fastener comprising a U-shaped clamp adapted to fit around the frame members and having a threaded ear extending outwardly therefrom to receive a headed bolt freely passing through an aperture in the covering panels has also been marketed for use with cylindrical frame members. These bolt and clamp fasteners, however, must be carefully lined up and threaded into tight engagement, require the attention of two men for an inordinate length of time and materially increase the cost of construction.

It, accordingly, is the primary object of this invention to provide a sheet metal building construction having a novel and speedy means for securing the sheet metal covering panels to the imperforate framework.

A further object of this invention is to provide a novel fastener for use in constructing sheet metal buildings.

Still another object of the present invention is to provide a fastener having a one-piece, wire-like shank composed of a pair of substantially parallel legs for use in securing the sheet metal covering panels of a building to an imperforate metal framework.

A further object of this invention resides in the provision of a fastener for securing a sheet metal covering panel of a building to a cylindrical metal framework.

Another object of this invention resides in providing a fastener having a soft metal head and a one-piece shank, the midportion of which is embedded in the soft metal head.

Further objects will appear from the following description when read in conjunction with the appended claims and attached drawings, wherein:

Figure 1 is an elevational view of a fastener made in accordance with the present invention;

Figure 2 is a fragmental sectional view showing the manner of attaching the head of the fastener of Figure 1 to the shank;

Figure 3 is a sectional view illustrating the manner in which the fastener of Figure 1 is used in securing a panel to a cylindrical frame member;

Figure 4 is a sectional view on line 4—4 of Figure 3 looking in the direction of the arrows;

Figure 5 is a sectional view illustrating the manner in which the fastener of Figure 1 is employed in securing a panel to an L-frame member; and Figure 6 is a sectional view illustrating the manner in which the fastener of Figure 1 is employed in securing a panel to a channel member.

With continued reference to the drawings wherein the same reference characters are used throughout to designate the same parts, numeral 10 generally indicates a fastener made in accordance with the present invention. Fastener 10, as clearly seen in Figures 1 and 2, comprises a shank portion 11, having a pair of substantially straight legs 12 and 13 disposed in side by side relation and formed by bending a single piece of wire-like stock intermediate its ends to form a bight portion 14, and a head 15 of soft metal, such as lead, formed around bight 14 in any suitable manner. Preferably head 15 is provided with a shallow conical or dished recess 16 facing in the direction in which shank 11 extends to provide a thin, annular sealing edge 17 for a purpose to be hereinafter pointed out.

While head 15 is preferably molded around bight 14 so as to interlock therewith and provide a cross bar 18 for sustaining the pull of shank 11 in use, it will be appreciated that head 15 may be made in any other suitable manner so long as it is positively secured to the shank 11 to resist the axial forces encountered in use without becoming disassociated from the shank.

Fastener 10 is particularly designed for securing sheet metal panelling to a cylindrical frame member in a rapid and satisfactory manner. Such building constructions are common in the Southern States and are usually made up by constructing a framework from discarded boiler tubes suitably connected by threaded elbows, T's, crosses and the like in a manner that will be obvious in the art. Fastening devices heretofore proposed either require the services of a skilled construction worker to properly assemble them or slow down the construction and substantially increase construction costs due to the time required to assemble them. As a consequence, such sheet metal constructions cannot be economically constructed with the inexperienced labor available and the use of such constructions is not as widespread as would be the case if suitable fastening means were available.

As an illustration of the manner of using the fastener of Figures 1 and 2, reference is made to Figures 3 and 4 where the fastener 10 is utilized to secure a corrugated sheet metal panel 21 having spaced fastener receiving apertures 22 therein to the tubular frame member 23 of a frame construction of the type heretofore described. Member 23 may be a section of boiler tube, a cylindrical rod or any other suitable member. The fastener 10 is assembled by passing shank 11 through aperture 22 and bending legs 12 and 13 outwardly and around the cylindrical member 23 and then twisting the free ends together as shown at 24 to tightly secure the shank 11 around member 23 and draw head 10 into sealing contact with the surface 25 of panel 21 and then draw panel 21 into tight engagement at 26 with frame member 23. In assembling these fasteners, one man passes the shank of the fastener through the aperture 22 and a man on the opposite side of the panel grasps the end of the shank and bends the legs around the frame member and twists them together to fasten them in place. It will be appreciated that the twisting of the ends of legs 12 and 13 draws the respective legs around the cylindrical member in the direction of the arrows and transmits the pull exerted by the legs to cross bar 18 so as to concentrate the pulling forces at the center of recess 16. As a consequence, head 15 is drawn into sealing contact with member 21. The surface 25 of panel 21 and the relatively thin sealing edge 17 of soft metal head 15 are engaged first, the latter being deformed to accommodate itself to the contour of the surface 25 due to the localized pressures on the relatively soft sealing edge.

While the fastener of the present invention is particularly suitable for securing a panel to a cylindrical frame member, it is equally suitable for securing a panel to an L-member, such as member 28 of Figure 5. Referring to Figure 5 the corrugated panel 21a is secured to L-member 28 by passing the shank 11 of the fastener through aperture 22a and bending legs 12 and 13 around L-member 28 and twisting their free ends together as shown at 24a.

Figure 6 illustrates the manner of securing a flat sheet metal panel 31 to a channel member 32. In this construction, the legs 12 and 13 are bent at 33 so that portions 35 and 36 lie in face contact with the face 37 of panel 31 and the face 38 of channel member 32. The legs are then bent at 39 and drawn tightly around the channel member 32 and their free ends are twisted together at 24b to secure the fastener to the channel member.

The invention may be embodied in other specific forms without departing from the spirit or essential characteristics thereof. The present embodiment is therefore to be considerd in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A metallic fastener for securing two or more structural members in assembled relation comprising a solid deformable metal head having a concave face terminating in a thin peripheral edge and adapted, upon the application of pressure, to assume the contour of the structural member which it abuts, and a shank having a first straight section, a second straight section contiguous and parallel to said first section, and a third section of substantially circular configuration embedded in said metallic head and forming a continuation of said first and second sections.

2. A metallic fastener for securing two or more structural members in assembled relation comprising a shank having a first straight section, a second straight section contiguous and parallel to said first section, and a third section of substantially circular configuration forming a continuation of said first and second sections, and a deformable solid head having a solid apex formed around and through said circular shank section.

3. A metallic fastener for securing two or more structural members in assembled relation comprising, a deformable metal head having a concave face terminating in a thin peripheral edge adapted to bear on one of said members; a shank having two straight sections lying in spaced side by side axial relation and a third section of substantially circular configuration joining two adjacent ends of said straight sections and embedded in said head, the free ends of said straight sections being adapted when twisted about each other to reduce the axial dimension of the space between said straight sections whereby, when one of said structural members is clamped in said space said shank will be tensioned axially to apply a force to said head thereby forcing the concave face of said head to conform to the contour of one of the structural members.

SABIN J. GIANELLONI, JR.

REFERENCES CITED

The following references are of record in the file of this patent:

UNITED STATES PATENTS

| Number | Name | Date |
| --- | --- | --- |
| 330,995 | McGill | Nov. 24, 1885 |
| 634,788 | Young | Oct. 10, 1899 |
| 859,934 | Freschl | July 16, 1907 |
| 861,562 | Wade | July 30, 1907 |
| 1,576,727 | Deniston | Mar. 16, 1926 |
| 1,822,559 | Belding | Sept. 8, 1931 |
| 1,924,212 | Mathewson | Aug. 29, 1933 |

FOREIGN PATENTS

| Number | Country | Date |
| --- | --- | --- |
| 236,906 | Great Britain | Feb. 11, 1926 |